May 21, 1968  C. E. GRUENINGER  3,383,988
MILLING CUTTER CARTRIDGE
Filed May 19, 1966
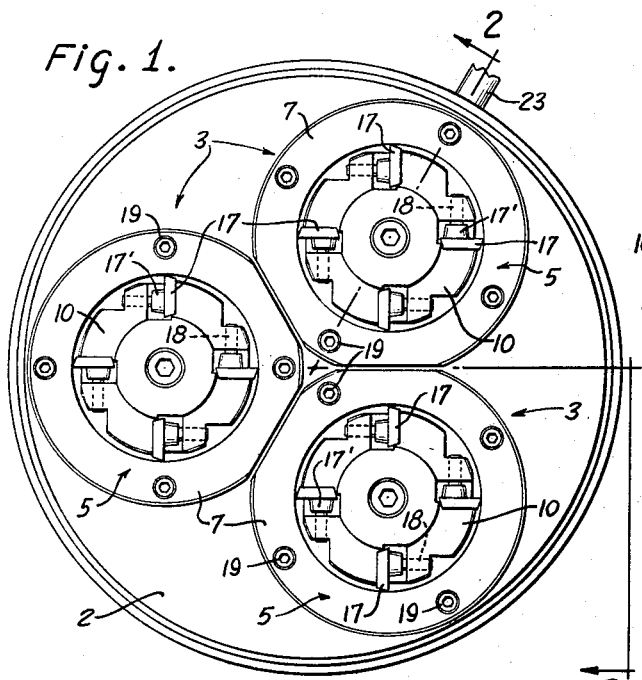
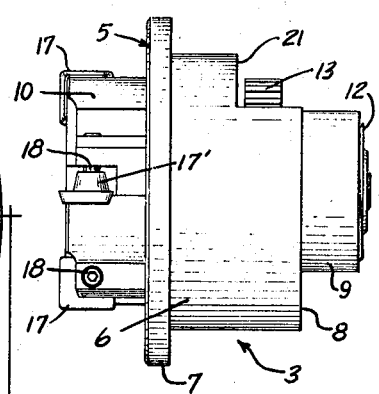
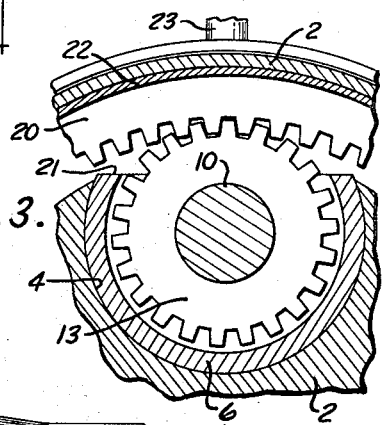
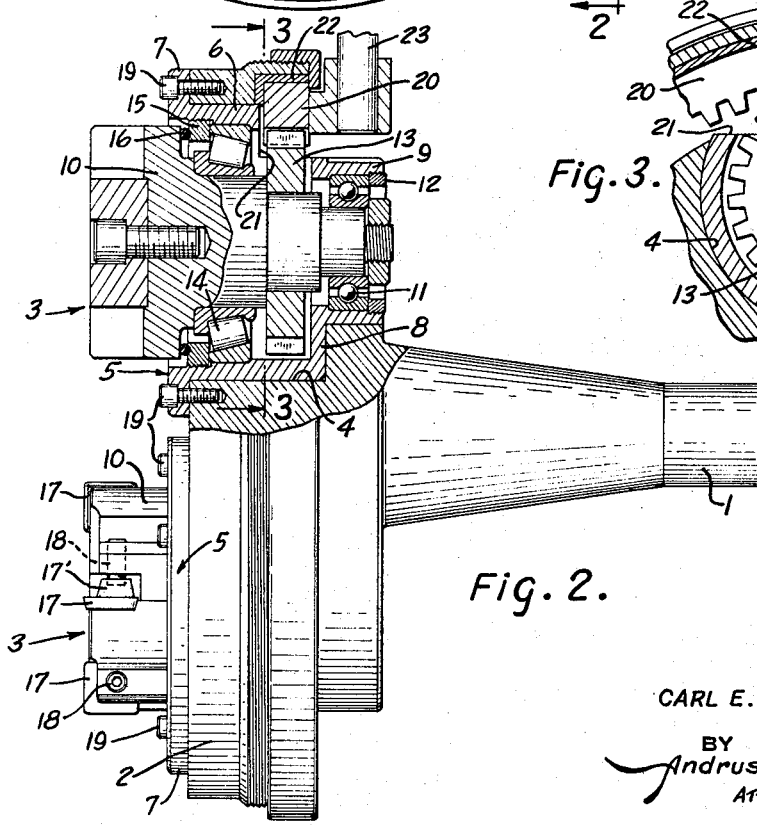
INVENTOR
CARL E. GRUENINGER
BY
Andrus & Starke
ATTORNEYS

United States Patent Office 3,383,988
Patented May 21, 1968

3,383,988
MILLING CUTTER CARTRIDGE
Carl E. Grueninger, Elm Grove, Wis., assignor to Waukesha Cutting Tools, Inc., Waukesha, Wis., a corporation of Wisconsin
Filed May 19, 1966, Ser. No. 551,456
3 Claims. (Cl. 90—11)

This invention relates to a milling cutter, and more particularly to a rotary cutting device for machine tools.

Prior devices of the type here involved have included an assembly of a plurality of cutters mounted for rotation on a cutter body or shaft. Problems have arisen wherein one of the cutters would be damaged or wear faster than the other cutters. The entire assembly would then have to be taken apart in order to repair the single cutter. Often, the time consumed in such repairs made it more feasible to throw the entire plural-cutter assembly away than to try and repair it.

The present invention solves the aforementioned problem, and provides a novel assembly wherein each rotatable cutter is individually mounted in a cartridge. The cartridge in turn is removably mounted on the shaft or body and may be quickly replaced by a different cartridge if required.

The accompanying drawing shows the best mode presently contemplated by the inventor for carrying out the invention.

In the drawings:

FIGURE 1 is a front elevation of a milling cutter constructed in accordance with the invention;

FIG. 2 is a section taken on line 2—2 of FIGURE 1;

FIG. 3 is a section taken on line 3—3 of FIG. 2; and

FIG. 4 is a reduced side elevation of the removable cartridge.

As shown in the drawing, the milling cutter comprises a shaft 1 adapted to be attached to the spindle of a suitable machine tool. The forward end of shaft 1 is enlarged to form an annular head 2 which rotates about a central axis when the shaft is driven by the spindle.

Head 2 is adapted to support a plurality of cutter bodies 3, the number of such bodies shown being three. For this purpose, three large annular openings 4 are formed in the head, and are constructed to receive bodies 3 therethrough. In accordance with the invention, each body 3 comprises a self-contained cartridge.

Each cartridge comprises an annular housing 5 having a cylindrical wall 6, a transverse front flange 7, a transverse rear flange 8, and a cylindrical wall 9 of reduced dimension which extends rearwardly from flange 8. The housing is thus generally hat-shaped.

A tool supporting spindle 10 is adapted to be rotatably mounted in said housing. For this purpose, the outer surface of spindle 10 is of stepped construction, with the steps increasing in diameter in a forward direction. As shown, a suitable rear bearing 11 is mounted with its races disposed between a rear step of spindle 10 and the inner wall of housing flange 8. A retaining ring 12 is threaded into flange 8 to hold bearing 11 in place with the rear reduced end of spindle 10 extending therethrough. A drive gear 13 is fixedly mounted on an intermediate step of spindle 10, for purposes to be described. A suitable front bearing 14 is mounted with its races disposed between a front step of spindle 10 and the inner wall of flange 8. A front retaining ring 15 is threaded into wall 6 to hold bearing 14 in place. In addition, an annular gasket 16 is disposed between ring 15 and the flanged head of spindle 10. Suitable cutting tools shown as throw away carbide inserts 17 are mounted on the front face of spindle 10 in circumferential array. They may be fixed to the spindle in any suitable manner, such as by a holding block 17' and bolt 18.

The entire cutter body 3 is shaped to fit through head openings 4 and are mounted to the head by a plurality of bolts 19 which extend through housing flange 7 into the head.

Head 2 includes an annular gear ring 20 suitably mounted thereon, ring 20 extending through an opening 21 in wall 6 and flange 8 of housing 5. A suitable bearing 22 permits relative rotation between head 2 and ring 20. The teeth of ring 20 mesh with the teeth of drive gear 13.

During operation of the device, it is necessary to keep gear ring 20 stationary while head 2 rotates. For this purpose, a control arm 23 is secured to ring 20 and may be fixed at its outer end in any suitable manner, not shown.

Rotation of head 2 will cause cutter bodies 3 to rotate about the head axis. At the same time, however, gears 13 will be driven by ring 20 so that spindles 10 rotate about their own axes.

In the event that any part of cutter cartridge assembly 3 should be damaged, either the damaged part can be replaced, or it is a simple task to remove the entire cartridge by un-bolting bolts 19 and immediately installing a fresh completely assembled cartridge. The resulting savings in time and labor can be substantial.

Various modes of carrying out the invention are contemplated as being within the scope of the following claims particularly pointing out and distinctly claiming the subject matter which is regarded as the invention.

I claim:

1. For attachment to a milling cutter head having a ring gear thereon which is fixable against rotation, a removable milling cutter cartridge comprising:

(a) a generally hat-shaped housing having a cylindrical wall and a radial flange disposed rearwardly therefrom,
    (b) a spindle disposed for rotation within said housing and adapted to have cutting tool means thereon,
    (c) front and rear bearings disposed between said spindle and said housing,
    (d) a drive gear fixedly mounted on said spindle between said bearings,
    (e) said wall and flange having an opening therein for extension of the head ring gear therethrough for engagement with said drive gear,
    (f) and means for securing said cartridge to the head.

2. The cartridge of claim 1 in which: said spindle is increasingly stepped from its rear end forwardly.

3. The cartridge of claim 2 which includes:

(a) front and rear retaining means for holding said front and rear bearings in place,
    (b) and an annular gasket disposed between said front retaining means and said spindle.

References Cited

UNITED STATES PATENTS 2,199,379    5/1940    Törnebohm _____ 90—11

FRANCIS S. HUSAR, *Primary Examiner.*